United States Patent
Beerbower et al.

(10) Patent No.: US 9,201,685 B2
(45) Date of Patent: Dec. 1, 2015

(54) TRANSACTIONAL CACHE VERSIONING AND STORAGE IN A DISTRIBUTED DATA GRID

(75) Inventors: Tom Beerbower, Holland, PA (US); John P. Speidel, Langhorne, PA (US); Jonathan Purdy, Brookline, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 744 days.

(21) Appl. No.: 13/359,375

(22) Filed: Jan. 26, 2012

(65) Prior Publication Data

US 2012/0197994 A1 Aug. 2, 2012

Related U.S. Application Data (60) Provisional application No. 61/437,532, filed on Jan. 28, 2011.

(51) Int. Cl.
*G06F 15/16* (2006.01)
*G06F 9/46* (2006.01)

(52) U.S. Cl.
CPC .................................. *G06F 9/466* (2013.01)

(58) Field of Classification Search
CPC ................................................. H04L 63/0435
USPC ........................................................ 709/204
See application file for complete search history.

(56) References Cited

U.S. PATENT DOCUMENTS

| | | | |
|---|---|---|---|
| 5,784,569 | A | 7/1998 | Miller et al. |
| 5,940,367 | A | 8/1999 | Antonov |
| 5,991,894 | A | 11/1999 | Lee et al. |
| 5,999,712 | A | 12/1999 | Moiin et al. |
| 6,182,139 | B1 | 1/2001 | Brendel |
| 6,377,993 | B1 | 4/2002 | Brandt et al. |
| 6,487,622 | B1 | 11/2002 | Coskrey, IV et al. |
| 6,490,620 | B1 | 12/2002 | Ditmer et al. |
| 6,615,258 | B1 | 9/2003 | Barry et al. |
| 6,631,402 | B1 | 10/2003 | Devine et al. |
| 6,693,874 | B1 | 2/2004 | Shaffer et al. |
| 6,714,979 | B1 | 3/2004 | Brandt et al. |
| 6,968,571 | B2 | 11/2005 | Devine et al. |
| 7,114,083 | B2 | 9/2006 | Devine et al. |
| 7,139,925 | B2 | 11/2006 | Dinker et al. |
| 7,266,822 | B1 | 9/2007 | Boudnik et al. |
| 7,328,237 | B1 | 2/2008 | Thubert et al. |
| 7,376,953 | B2 | 5/2008 | Togasaki |
| 7,464,378 | B1 | 12/2008 | Limaye et al. |

(Continued)

*Primary Examiner* — Glenford Madamba
(74) *Attorney, Agent, or Firm* — Tucker Ellis LLP (57) ABSTRACT

A set of techniques are described for transactional cache versioning and data storage in a distributed data grid environment. A transaction coordinator maintains a commit version for each transaction. This version is updated over the course of the transaction. In addition, each cluster member maintains a local current version that is updated as messages are received from the client. When a client serving as a transaction coordinator sends a message, the transaction coordinator includes an associated transaction's current version value with the message. On receiving a message, the receiving member process sets its current version to be the maximum of its own value and the received value. The receiving member process includes its current version in the return message to the sender. On receiving the return messages, the client sets the transaction's commit version to be greater than the maximum of its own value and the received value.

18 Claims, 3 Drawing Sheets

(56) References Cited

U.S. PATENT DOCUMENTS

| | | |
|---|---|---|
| 7,543,046 B1 | 6/2009 | Bae et al. |
| 7,698,390 B1 | 4/2010 | Harkness et al. |
| 7,720,971 B2 | 5/2010 | Moutafov |
| 7,739,677 B1 | 6/2010 | Kekre et al. |
| 7,792,977 B1 | 9/2010 | Brower et al. |
| 7,814,248 B2 | 10/2010 | Fong et al. |
| 7,953,861 B2 | 5/2011 | Yardley |
| 8,209,307 B2 | 6/2012 | Erofeev |
| 8,312,439 B2 | 11/2012 | Kielstra et al. |
| 2002/0035559 A1 | 3/2002 | Crowe et al. |
| 2002/0073223 A1 | 6/2002 | Darnell et al. |
| 2002/0078312 A1 | 6/2002 | Wang-Knop et al. |
| 2003/0023898 A1* | 1/2003 | Jacobs et al. .................... 714/15 |
| 2003/0046286 A1* | 3/2003 | Jacobs et al. ...................... 707/8 |
| 2003/0120715 A1 | 6/2003 | Johnson et al. |
| 2003/0187927 A1 | 10/2003 | Winchell |
| 2003/0191795 A1 | 10/2003 | Bernardin et al. |
| 2004/0179471 A1 | 9/2004 | Mekkittikul et al. |
| 2004/0205148 A1 | 10/2004 | Bae et al. |
| 2004/0267897 A1 | 12/2004 | Hill et al. |
| 2005/0021737 A1 | 1/2005 | Ellison et al. |
| 2005/0083834 A1 | 4/2005 | Dunagan et al. |
| 2005/0097185 A1 | 5/2005 | Gibson et al. |
| 2005/0138460 A1 | 6/2005 | McCain |
| 2005/0193056 A1 | 9/2005 | Schaefer et al. |
| 2006/0095573 A1 | 5/2006 | Carle et al. |
| 2007/0016822 A1 | 1/2007 | Rao et al. |
| 2007/0118693 A1 | 5/2007 | Brannon et al. |
| 2007/0140110 A1 | 6/2007 | Kaler |
| 2007/0174160 A1 | 7/2007 | Solberg et al. |
| 2007/0237072 A1 | 10/2007 | Scholl |
| 2007/0260714 A1 | 11/2007 | Kalmuk et al. |
| 2007/0271584 A1 | 11/2007 | Anderson et al. |
| 2008/0183876 A1 | 7/2008 | Duvur et al. |
| 2008/0276231 A1 | 11/2008 | Huang et al. |
| 2008/0281959 A1 | 11/2008 | Robertson |
| 2009/0265449 A1 | 10/2009 | Krishnappa et al. |
| 2009/0320005 A1 | 12/2009 | Toub et al. |
| 2010/0128732 A1 | 5/2010 | Jiang |
| 2010/0211931 A1* | 8/2010 | Levanoni et al. ............. 717/122 |
| 2010/0312861 A1 | 12/2010 | Kolhi et al. |
| 2011/0041006 A1 | 2/2011 | Fowler |
| 2011/0107135 A1 | 5/2011 | Andrews et al. |
| 2011/0161289 A1 | 6/2011 | Pei et al. |
| 2011/0179231 A1 | 7/2011 | Roush |
| 2011/0249552 A1 | 10/2011 | Stokes et al. |
| 2012/0117157 A1 | 5/2012 | Ristock |
| 2012/0158650 A1 | 6/2012 | Andre et al. |
| 2012/0215740 A1 | 8/2012 | Vaillant et al. |

* cited by examiner

TRANSACTIONAL CACHE VERSIONING AND STORAGE IN A DISTRIBUTED DATA GRID

CLAIM OF PRIORITY

The present application claims the benefit of the following U.S. Provisional Patent Application, which is incorporated by reference herein in its entirety:

U.S. Provisional Patent Application No. 61/437,532, entitled "TRANSACTION FRAMEWORK FOR A DISTRIBUTED IN-MEMORY DATA GRID," by Tom Beerbower et al., filed on Jan. 28, 2011.

CROSS REFERENCE TO RELATED APPLICATIONS

This patent application is related to the following U.S. patent applications, each of which is incorporated by reference herein in its entirety:

U.S. Provisional Patent Application No. 61/437,521 entitled "IN-MEMORY DATA GRID FOR MANAGING AND CACHING DATA USED BY APPLICATIONS" by Christer Fahlgren et al., filed on Jan. 28, 2011;

U.S. Provisional Patent Application No. 61/437,536 entitled "QUERY LANGUAGE FOR ACCESSING DATA STORED IN A DISTRIBUTED IN-MEMORY DATA GRID" by David Leibs et al., filed on Jan. 28, 2011;

U.S. Provisional Patent Application No. 61/437,541 entitled "SECURITY FOR A DISTRIBUTED IN-MEMORY DATA GRID" by David Guy et al., filed on Jan. 28, 2011;

U.S. patent application Ser. No. 13/352,195 entitled "SYSTEM AND METHOD FOR USE WITH A DATA GRID CLUSTER TO SUPPORT DEATH DETECTION" by Mark Falco et al., filed on Jan. 17, 2012;

U.S. patent application Ser. No. 13/352,203 entitled "SYSTEM AND METHOD FOR USING CLUSTER LEVEL QUORUM TO PREVENT SPLIT BRAIN SCENARIO IN A DATA GRID CLUSTER" by Robert H. Lee et al., filed on Jan. 17, 2012;

U.S. patent application Ser. No. 13/360,487 entitled "PUSH REPLICATION FOR USE WITH A DISTRIBUTED DATA GRID" by Brian Oliver et al., filed on Jan. 27, 2012; and U.S. patent application Ser. No. 13/359,391 entitled "PROCESSING PATTERN FRAMEWORK FOR DISPATCHING AND EXECUTING TASKS IN A DISTRIBUTED COMPUTING GRID" by Brian Oliver et al., filed on Jan. 26, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to transactions and versioning in distributed cache environments.

BACKGROUND

In recent times, various data management systems have become the backbone of information technology and other systems. Virtually all businesses, consumers and other entities utilize some form of data management ranging from enterprises that manage huge sets of data, to individuals that desire to store a personal data, music or other information.

The use of transactions is a common form of accessing and modifying a data set. In this context, a transaction can be thought of as a unit of work performed on a piece of data such as a create, read, update or delete (CRUD) operation. Transactions provide reliable units of work that can allow correct recovery from failures and keep the data consistent, as well manage concurrency between multiple programs or threads accessing the data to provide isolation between those programs.

In order to maintain transaction isolation it is typically a requirement of a transactional system to provide some partial ordering of events. This ensures that transactions are processed in a reliable manner and removes interference (data inconsistency) between concurrent executions. One way to perform this ordering is to base them on a timestamp so that it can be determined which event has priority over another event. In a distributed system, however, it can be extremely difficult to base such ordering of events on a global timestamp because of the difficulties of keeping the distributed processes perfectly synchronized. It is thus desirable to address the issue of ordering of events for transactions within a distributed cache system.

BRIEF SUMMARY

In accordance with various embodiments, a set of techniques are described for transactional cache versioning and data storage in a distributed data grid environment. A transaction coordinator maintains a commit version for each transaction. This version is updated over the course of the transaction. In addition, each cluster member maintains a local current version that is updated as messages are received from the client. When a client serving as a transaction coordinator sends a message, the transaction coordinator includes an associated transaction's current version value with the message. On receiving a message, the receiving member process sets its current version to be the maximum of its own value and the received value. The receiving member process includes its current version in the return message to the sender. On receiving the return messages, the client sets the transaction's commit version to be greater than the maximum of its own value and the received value.

DETAILED DESCRIPTION

In accordance with various embodiments, a transaction framework is described for a distributed data grid that manages data used by application objects. The data grid is a data management system for application objects that are shared across multiple servers, require low response time, high throughput, predictable scalability, continuous availability and information reliability. As a result of these capabilities, the data grid is ideally suited for use in computational intensive, stateful middle-tier applications. The data management is targeted to run in the application tier, and is often run in-process with the application itself, for example in the application server cluster. In accordance with an embodiment, a data grid is a system composed of multiple servers that work together to manage information and related operations—such as computations—in a distributed environment. An in-memory data grid then is a data grid that stores the information in memory to achieve higher performance and uses redundancy by keeping copies of that information synchronized across multiple servers to ensure resiliency of the system and the availability of the data in the event of server failure.

In accordance with an embodiment, the transaction framework provides partial ordering of events within a distributed system via an algorithm based on Lamport Timestamps. Because the events are partially ordered (events are only ordered with respect to other events that they are related to), there is no requirement to maintain a global clock. Therefore if two transactions are intersecting then their committed versions are relevant to each other and imply an ordering between the two transactions. If transactions do not intersect then no ordering between them is required.

Figure 1:
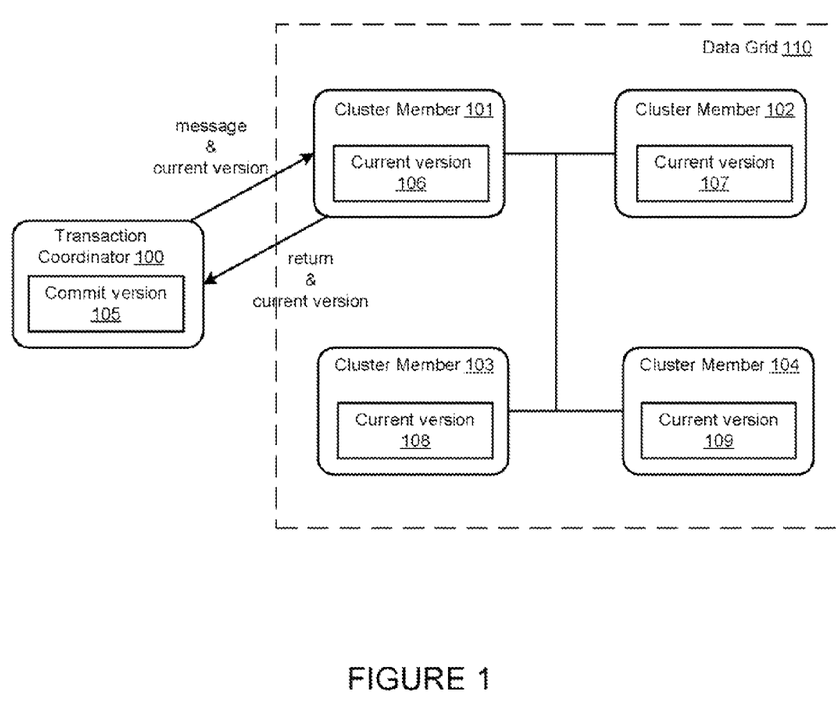
FIG. 1 is an illustration of the transaction versioning, in accordance with various embodiments of the invention.

FIG. 1 is an illustration of the transaction versioning, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a transaction coordinator 100 (e.g. client) maintains a commit version 105 for each transaction. This version is updated over the course of the transaction. Each cluster member 101-104 maintains a local current version 106-109 that is updated as messages are received from the client. As illustrated in the figure, when a client 100 (transaction coordinator) process sends a message, the transaction coordinator includes an associated transaction's current version value with the message. On receiving a message, the receiving member 101 process sets its current version to be the maximum of its own value and the received value. The receiving member process includes its current version in the return message to the sender. On receiving the return messages, the client sets the transaction's commit version to be greater than the maximum of its own value and the received value.

In accordance with an embodiment, the transaction framework also maintains a consistent read version which is used to provide a consistent read isolation level. This provides transaction scoped read consistency. This isolation level guarantees that all the data read in a transaction comes from a single point in time; the time that the transaction began.

In accordance with an embodiment, a commit version 105 is maintained for each transaction. The commit version 105 is updated by the transaction coordinator 100 in the transaction's local state over the life of the transaction. When a mutating operation occurs in the context of a transaction, the commit version of the transaction may be updated based on the versions returned from the cluster members. When the transaction is committed, the commit version becomes that transaction's version of record. The commit version is thus maintained per transaction, is updated each time a mutating operation occurs in the context of the transaction and is used as the version of record when the transaction is committed.

In accordance with an embodiment, the current version (106, 107, 108, 109) value is maintained for each storage enabled cluster member (101, 102, 103, 104). The current version is updated in each cluster member's local state each time a message is received so that the current version is the maximum of the member's current value and the received value. In accordance with an embodiment, the current version is monotonic; is maintained per cluster member; is attached to a message for any mutating operation (client); is obtained from message of any mutating operation and set on member (server) if greater than current version value for the member; and is obtained from the member and set on the result after any mutating operation. The returned version is used to calculate (+1) the commit version for the transaction.

In accordance with an embodiment, a consistent read version value is maintained by the cluster. The consistent read version is the version that will be used to obtain a consistent view of the system for connections configured as read consistent. In accordance with an embodiment, the consistent read version must be monotonic, is maintained per member; is set on message for any read operation (client). Actual version can be used for consistent read, while LONG_MAX can be used for read committed. The consistent read version is obtained from message of any read operation (server) and is used to obtain the correct version of the values being read for consistent reads.

Figure 2:
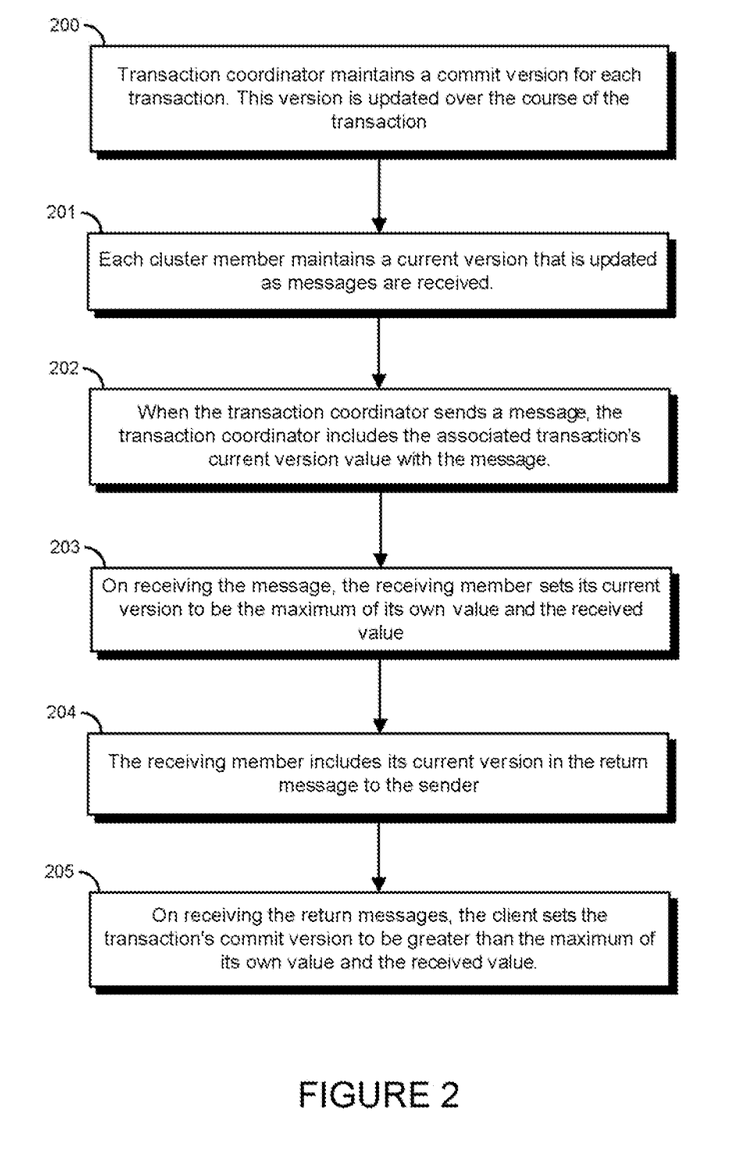
FIG. 2 is an illustration of the process for transaction versioning, in accordance with various embodiments of the invention.

FIG. 2 is an illustration of the process for transaction versioning, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 200, the transaction coordinator maintains a commit version for each transaction, wherein the commit version is updated over the course of the transaction. In step 201, each cluster member maintains a current version that is updated as messages are received. In step 202, when the transaction coordinator sends a message, the transaction coordinator includes the associated transaction's current version value with the message. In step 203, upon receiving the message, the receiving member sets its current version to be the maximum of its own value and the received value. In step 204, the receiving member includes its current version in the return message to the sender. In step 205, upon receiving the return messages, the client sets the transaction's commit version to be greater than the maximum of its own value and the received value.

Figure 3:
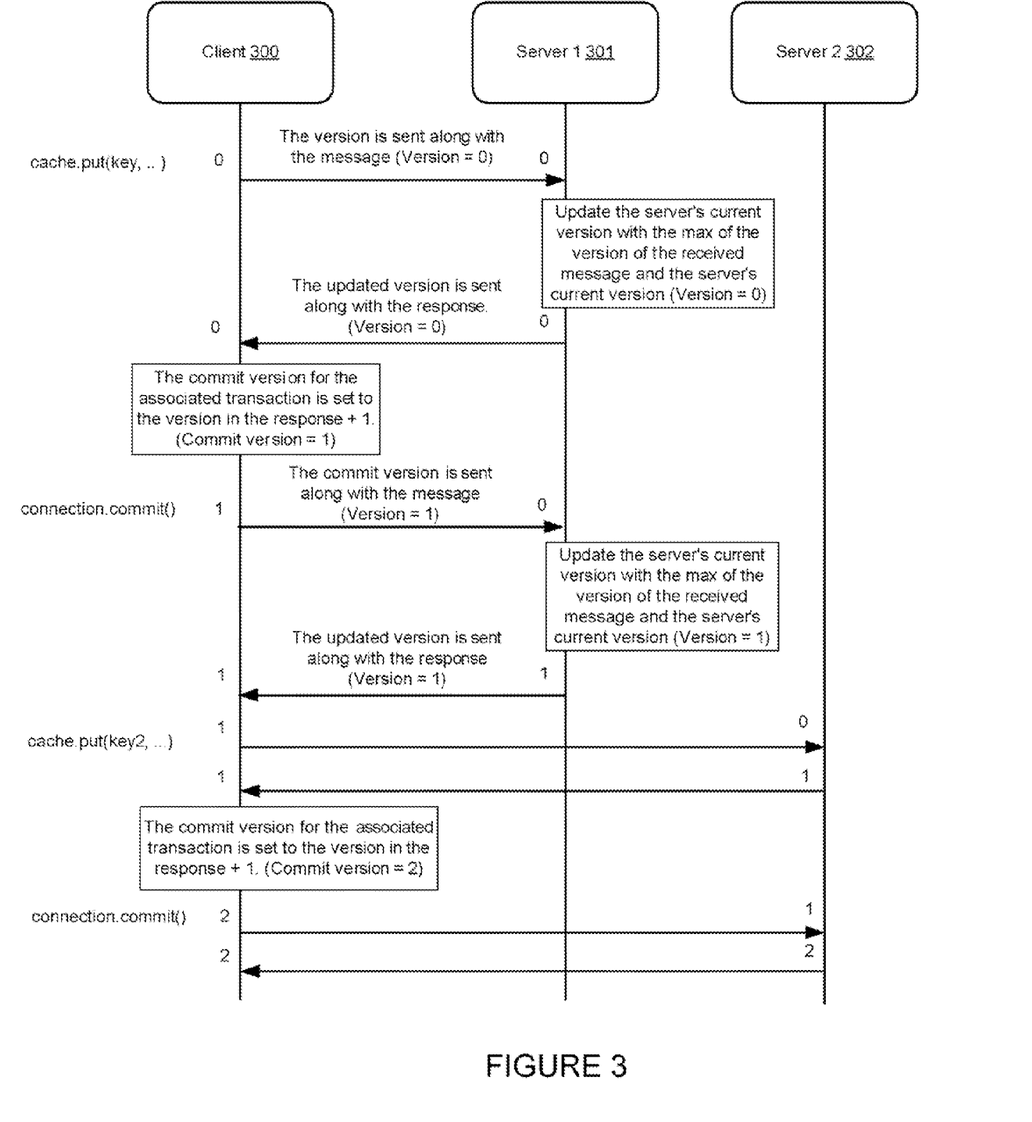
FIG. 3 is an illustration of an example showing the interaction between a client and the cluster of servers using transactional caches, in accordance with various embodiments of the invention.

FIG. 3 is an illustration of an example showing the interaction between a client and the cluster of servers using transactional caches, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated, the diagram shows the interaction between a client and servers using transactional caches. The diagram shows how the version counters are passed along with messages to drive version progression across the cluster.

In this example, the application code on the client 300 issues a put operation. The key passed to the put operation is associated with Server 1 301. Server 1 301 is responsible for storing that data. The message passed to the server contains the version associated with the transaction context from the client (transaction coordinator). On receiving the message the transaction framework on the server will update its own current version to be the max of its version and the received version. This version is returned with the result of the put operation. The client 300 will update the commit version of the transaction context to be the max of its current value and the received value+1.

In accordance with the illustrated example, the application code then issues another put operation. In this instance, Server 2 302 is responsible for storing the data. The message passed to the server 2 302 contains the version associated with the transaction context from the client (transaction coordinator). On receiving the message the server 302 will update its own current version to be the max of its version and the received version. This version is returned with the result of the put operation. The client 300 will update the commit version of the transaction context to be the max of its current value and the received value, plus one.

Storage

In accordance with an embodiment, the transactional cache uses several distributed caches as internal system tables for the storage of natural keys, versioned cache values and commit records. This system of storage allows the transactional framework to store multiple versions of a value for a single key in any transactional cache. This enables transaction isolation and read consistency.

In accordance with an embodiment, when a transactional cache is created, its underlying storage is ensured. Accordingly, the distributed caches that make up the transactional cache's storage are ensured through the associated service. This internal storage is set up on a per transactional cache basis. As such, each transactional cache will have its own set of distributed caches created for its storage.

In accordance with various embodiments, the tables used by the transactional cache include but are not limited to the following tables:

Natural Table

A natural table that maps the natural key (user provided key) to a synthetic key. When a natural key is first used in a transactional cache, a synthetic key is created for it by the transaction framework. This key is unique in the system, exists in a one to one relationship with the natural key and encodes certain information such as the partition number of the natural key.

For the following examples, the synthetic keys are simply shown as "sk" with some numeric identifier appended. The example table below represents the natural table a transactional cache named "txcache1". In this case, there are three natural keys known to the system that have been associated with system assigned synthetic keys.

$NATURAL-txcache1

| Key  | SyntheticKey |
|------|--------------|
| key1 | sk001        |
| key2 | sk002        |
| key3 | sk003        |

Values Table

The values table maps an transaction id(xid)/synthetic composite key to a value. By using a key that includes both the transaction id and synthetic key, the transaction framework is able to store multiple values for each natural key. Deleted values are represented by a NIL value entry in the cache. In accordance with an embodiment, it may be important to show that a key may be associated with some value in one transaction but deleted in another.

The transaction id is simply a unique identifier for a transaction. For the following examples, the transaction identifiers are simply shown as "tx" with some numeric identifier appended.

The example table below shows the values table the transactional cache named "txcache1". As shown, there are different values for the same synthetic key. For example, there are three different entries for the synthetic key "sk001" with the values of "A1", "A2" and NIL, each associated with a different transaction.

$VALUES-txcache1

| Xid/SyntheticKey | Value |
|------------------|-------|
| tx001/sk001      | A1    |
| tx002/sk001      | A2    |
| tx002/sk002      | B1    |
| tx003/sk002      | B2    |
| tx003/sk003      | C1    |
| tx004/sk001      | <NIL> |

Versions Table

The versions table maps an xid/synthetic key to a committed version. The version is a monotonically increasing value that provides an order to the committed transactions. When a transaction is committed, an entry is added to the versions table for each key that was involved in the transaction. The value is the commit version associated with the transaction being committed.

The example table below shows the versions table the transactional cache named "txcache1". In this case there are four committed transactions.

$VERSIONS-txcache1

| Xid/SyntheticKey | Version |
|------------------|---------|
| tx001/sk001      | 1       |
| tx002/sk001      | 5       |
| tx002/sk002      | 5       |
| tx003/sk002      | 12      |
| tx003/sk003      | 12      |
| tx004/sk001      | 17      |

Consistent Read

A consistent view of the transactional cache can be obtained by querying the versions table for the maximum version for each unique synthetic key where the version is less than or equal to some given version.

For example, given the above versions table, a consistent read at version 15 would produce the following rows from the versions table:

| Xid/SyntheticKey | Version |
|---|---|
| tx002/sk001 | 5 |
| tx003/sk002 | 12 |
| tx003/sk003 | 12 |

The xid/synthetic keys from these results can be used to obtain the values of the cache at version 15 from the values table. Using the results above would produce the following rows from the values table:

| Xid/SyntheticKey | Value |
|---|---|
| tx002/sk001 | A2 |
| tx003/sk002 | B2 |
| tx003/sk003 | C1 |

The synthetic keys from the above results can be used to obtain the associated natural keys of the transactional cache. The consistent read of the transactional cache named "txcache1" at version 15 would appear as follows:
txcache1

| Key | Value |
|---|---|
| key1 | A2 |
| key2 | B2 |
| key3 | C1 |

Key Partitioning Strategy

In accordance with an embodiment, a single operation to a transactional cache may involve more than one of the related system caches. For example, a put on a transactional cache is invoked against the natural table but causes an insert into the values table. The specialized processors used to perform transactional cache operations may make changes directly against the backing maps of any of the related system tables. This means that all of the entries related to a given natural key may need to be co-located in the same partition.

In accordance with an embodiment, the transaction framework can achieve this by providing a custom key partitioning strategy that makes use of the partition number encoded in each synthetic key which is set to match the partition number of its associated natural key.

The following example shows the state of the transactional cache and its underlying storage as transactions are committed. For simplicity, this example assumes that only a single process is mutating the transactional cache during the course of each transaction.

Transaction 1

The following transaction is a simple put on a transactional cache. The connection is set to auto commit true, so the put is immediately committed.

NamedCache txcache1=connection.getCache("txcache1");

connection.setAutoCommit(true);

txcache1.put("key1", "A1");

The above put operation results in an association of the value "A1" with the key "key1". The user of the transactional cache could verify this with a get operation, for example. A read committed view of the transactional cache following the auto commit put operation could be illustrated as the following:
txcache1

| Key | Value |
|---|---|
| key1 | A1 |

In accordance with an embodiment, this direct association between key and value does not actually exist in the transactional cache the way it does in a normal distributed cache. In a transactional cache multiple versions of a value may be maintained so the association between key and value must be derived for given a version as described above.

The following tables show a snapshot of how the internal transactional cache storage would look following the auto commit put operation.

After the put operation, the natural table for txcache1 will contain an association between the given key "key1" and some synthetic key value "sk001".
$NATURAL-txcache1

| Key | SyntheticKey |
|---|---|
| key1 | sk001 |

After the put operation the values table for the txcache1 will contain an entry that associates the transaction "tx001" and the synthetic key "sk001" with the given value "A1".
$VALUES-txcache1

| Xid/SyntheticKey | Value |
|---|---|
| tx001/sk001 | A1 |

After the put operation the versions table for the txcache1 will contain an entry that associates the transaction "tx001" and the synthetic key "sk001" with a commit version of 1.
$VERSIONS-txcache1

| Xid/SyntheticKey | Version |
|---|---|
| tx001/sk001 | 1 |

Transaction 2

The following shows a transaction on a transactional cache that includes multiple put operations. The connection is set to auto commit false, so neither put is committed until commit is called on the connection.

NamedCache txcache1=connection.getCache("txcache1");

connection.setAutoCommit(false);

txcache1.put("key1", "A2");

txcache1.put("key2", "B1");

connection.commit( );

The above operations result in an association of the value "A2" with the key "key1" and "B1" with the key "key2". A read committed view of the transactional cache following the commit of Transaction 2 could be illustrated as the following . . .
txcache1

| Key | Value |
|---|---|
| key1 | A2 |
| key2 | B1 |

After the commit of Transaction 2, the natural table for txcache1 will still contain an entry for the key "key1" as well as a new entry for the given key "key2" and the synthetic key value "sk002".

$NATURAL-txcache1

| Key | SyntheticKey |
|---|---|
| key1 | sk001 |
| key2 | sk002 |

After the commit of Transaction 2, the values table for the txcache1 will contain an entries that associate the transaction "tx002" and the synthetic keys with the values passed in the put operations. This example shows that the previous value from Transaction 1 is still maintained in the values table.

$VALUES-txcache1

| Xid/SyntheticKey | Value |
|---|---|
| tx001/sk001 | A1 |
| tx002/sk001 | A2 |
| tx002/sk002 | B1 |

After the commit of Transaction 2, the versions table for txcache1 will contain entries that associate the transaction "tx001" and each synthetic key used in the transaction with a commit version of 5. It should be noted that the commit version value of 5 is not significant other than for the fact that it is monotonically increasing. It should also be noted that there are multiple committed versions for the synthetic key "sk001".

$VERSIONS-txcache1

| Xid/SyntheticKey | Version |
|---|---|
| tx001/sk001 | 1 |
| tx002/sk001 | 5 |
| tx002/sk002 | 5 |

Transaction 3

The following shows a transaction on a transactional cache that includes multiple put operations and a remove operation. The connection is set to auto commit false, so nothing is committed until commit is called on the connection.

NamedCache   txcache1=connection.getCache("txcache1");
      connection.setAutoCommit(false);
      txcache1.remove("key1");
      txcache1.put("key2", "B2");
      txcache1.put("key3", "C1");
      connection.commit( );

The above operations result in an association of the value "B2" with the key "key2" and "C1" with the key "key3" as well as the removal of the value for the key "key1". A read committed view of the transactional cache following the commit of Transaction 3 could be illustrated as the following:

txcache1

| Key | Value |
|---|---|
| key2 | B2 |
| key3 | C1 |

After the commit of Transaction 3, the natural table for txcache1 will still contain an entry for the key "key1" and "key2" as well as a new entry for key "key3" and the synthetic key value "sk003".

$NATURAL-txcache1

| Key | SyntheticKey |
|---|---|
| key1 | sk001 |
| key2 | sk002 |
| key3 | sk003 |

After the commit of Transaction 3, the values table for txcache1 will contain an entries that associate the transaction "tx003" and the synthetic keys with the values passed in the cache operations. The table below shows that the previous values from Transaction 1 and Transaction 2 are still maintained in the $Values table.

$VALUES-txcache1

| Xid/SyntheticKey | Value |
|---|---|
| tx001/sk001 | A1 |
| tx002/sk001 | A2 |
| tx002/sk002 | B1 |
| tx003/sk001 | <NIL> |
| tx003/sk002 | B2 |
| tx003/sk003 | C1 |

After the commit of Transaction 3, the versions table for txcache1 will contain entries that associate the transaction "tx003" and each synthetic key used in the transaction with a commit version of 12.

$VERSIONS-txcache1

| Xid/SyntheticKey | Version |
|---|---|
| tx001/sk001 | 1 |
| tx002/sk001 | 5 |
| tx002/sk002 | 5 |
| tx003/sk001 | 12 |
| tx003/sk002 | 12 |
| tx003/sk003 | 12 |

In accordance with an embodiment, the transaction framework further includes an application programming interface (API) that is a connection-based API and provides atomic transaction guarantees across partitions and caches of the data grid even in the event of client failure. The transaction framework includes a set of transactional caches (which are specialized forms of distributed caches), transactional connections, optimistic transaction support, recovery managers and resource adapters. The transaction framework allows the use of the data grid caches in the context of a transaction. This includes most of the NamedCache API's including queries, entry processors, and aggregators. The transaction framework provides ACID guarantees, multiple read isolation levels, and deferred operations. The transaction framework uses transactional connections that represent a logical connection to the data grid.

In accordance with an embodiment, the transaction framework includes a transactional connection to the data grid. The transactional connection represents a logical connection to the data grid. It serves as a factory for transactional caches and provides transaction demarcation, such as auto-commit mode, commit and rollback. In accordance with a embodiment, the transactional connection allows the user to set an isolation level. The isolation level includes the following levels:

Read Committed—guarantees that only committed data is visible and does not provide any consistency guarantees (this is a default isolation level). Generally, this is the weakest isolation level and provides the highest performance.

Statement Consistent Read—provides statement-scoped read consistency. It guarantees that all the data read by a single operation comes from a single point in time when the statement began execution.

Statement Monotonic Consistent Read—same as the statement consistent read, but guarantees that all statements must be monotonic, meaning that a read is guaranteed to return a version that is greater or equal to a version that was previously encountered while using the connection.

Transaction Consistent Read—provides transaction-scoped read consistency. It guarantees that all the data read in a transaction comes from a single point in time when the transaction began.

Transaction Monotonic Consistent Read—same as the transaction consistent read but guarantees that all reads are monotonic.

In accordance with an embodiment, the transactional connection can function in an eager-mode or a non-eager mode. When in eager mode, every operation is immediately flushed to the grid. In non-eager mode, the flush of the operation can be deferred which can provide certain performance advantages since some of the operations may be batched when they are flushed.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing a transaction framework in a distributed data grid, said system comprising:
   a cluster of server nodes that store and manage data, said data being modified using a set of transactions; and
   a client that establishes a connection to the cluster and maintains a commit version having a commit version value for each transaction of said set of transactions;
   wherein the cluster of server nodes employs a set of distributed caches as internal system tables for storing natural keys, synthetic keys, and versioned cache values;
   wherein said internal system tables include a natural table that maps a natural key associated with a transaction to one or more synthetic key associated with the transaction, whereby, by using the natural key and one or more synthetic keys associated with the transaction in combination, the set of distributed caches are enabled to store a plurality of versioned cache values simultaneously for each transaction;
   wherein each server node in the cluster maintains for each transaction on the server node a current version having a current version value that is updated as messages are received from the client;
   wherein when the client sends a message to a receiving server node of the cluster of server nodes, the client includes with the message a commit version value associated with the transaction;
   wherein upon receiving the message, the receiving server node sets the current version maintained by the receiving server node to the maximum of the current version value being stored in said receiving server node and the associated transaction's commit version value received in the message from the client, and sends a return message to the client, said return message including the current version value set by the receiving server node; and
   wherein upon receiving the return message, the client sets the commit version to a commit version value greater than the maximum of the commit version value stored at the client and the current version value received from the receiving server node in the return message.

2. The system of claim 1, wherein the cluster of server nodes further maintain a consistent read version that provides transaction scoped read consistency.

3. The system of claim 1, wherein said commit version is updated by the client over a course of the transaction.

4. The system of claim 3, wherein when a mutating operation occurs in a context of the transaction, the commit version is updated based on versions returned from the nodes in the cluster.

5. The system of claim 1, wherein each synthetic key encodes a partition number of an associated natural key.

6. The system of claim 1, wherein said internal system tables include a values table that maps a transaction identifier and synthetic key to a versioned cache value.

7. A method for providing a transaction framework in a distributed data grid, said method comprising:
   storing a set of data on a cluster of server nodes, said data being modified using a set of transactions;
   maintaining a commit version for each transaction on a client that establishes a connection to the cluster;
   maintaining a set of distributed caches on set server nodes as internal system tables for storing natural keys, synthetic keys, and versioned cache values, wherein said internal system tables include a natural table that maps a natural key associated with a transaction to one or more synthetic key associated with the transaction, whereby, by using the natural key and one or more synthetic keys associated with the transaction in combination, the set of distributed caches are enabled to store a plurality of versioned cache values simultaneously for each transaction;
   maintaining on each server node in the cluster of server nodes and for each transaction on said each server node a current version having a current version value, said current version value being updated as messages are received from the client to the node;
   sending a message including an associated transaction's current version value from the client to receiving server node of the cluster of server nodes;
   receiving the message at the receiving server node, wherein the receiving server node sets the current version value stored in the receiving server node to be the maximum of the current value being stored in said receiving node and the current version value received from the client; and
   sending a return message from the receiving server node to the client, said return message including the current version value set by the receiving server node; and
   wherein upon receiving the return message, the client sets the commit version to a commit version value greater than the maximum of the commit version value stored at the client and the current version value received from the receiving server node in with the return message.

8. The method of claim 7, wherein the cluster of server nodes further maintain a consistent read version that provides transaction scoped read consistency.

9. The method of claim 7, wherein said commit version is updated by the client over a course of the transaction.

10. The method of claim 9, wherein when a mutating operation occurs in a context of the transaction, the commit version is updated based on versions returned from the nodes in the cluster.

11. The method of claim 7, wherein the current version is maintained at each node in the cluster and is updated in the node's local state each time a message is received by the node, such that the current version is a maximum of the node's current version and a value received from the client.

12. The method of claim 7, wherein said internal system tables include a values table that maps a transaction identifier and synthetic key to a value.

13. A non-transitory computer readable medium including instructions stored thereon for providing a transaction framework in a distributed data grid, which instructions, when executed, cause a system to perform steps comprising:
   storing a set of data on a cluster of server nodes, said data being modified using a set of transactions;
   maintaining a commit version for each transaction on a client that establishes a connection to the cluster;
   maintaining a set of distributed caches on set server nodes as internal system tables for storing natural keys, synthetic keys, and versioned cache values, wherein said internal system tables include a natural table that maps a natural key associated with a transaction to one or more synthetic key associated with the transaction, whereby, by using the natural key and one or more synthetic keys associated with the transaction in combination, the set of distributed caches are enabled to store a plurality of versioned cache values simultaneously for each transaction;
   maintaining on each server node in the cluster of server nodes and for each transaction on said each server node a current version having a current version value, said current version value being updated as messages are received from the client to the node;
   sending a message including an associated transaction's current version value from the client to receiving server node of the cluster of server nodes;
   receiving the message at the receiving server node, wherein the receiving server node sets the current version value stored in the receiving server node to be the maximum of the current value being stored in said receiving node and the current version value received from the client; and
   sending a return message from the receiving server node to the client, said return message including the current version value set by the receiving server node; and
   wherein upon receiving the return message, the client sets the commit version to a commit version value greater than the maximum of the commit version value stored at the client and the current version value received from the receiving server node in with the return message.

14. The non-transitory computer readable medium of claim 13, wherein the cluster of server nodes further maintain a consistent read version that provides transaction scoped read consistency.

15. The non-transitory computer readable medium of claim 13, wherein said commit version is updated by the client over a course of the transaction.

16. The non-transitory computer readable medium of claim 13, wherein when a mutating operation occurs in a context of the transaction, the commit version is updated based on versions returned from the nodes in the cluster.

17. The non-transitory computer readable medium of claim 13, wherein the current version is maintained at each node in the cluster and is updated in the node's local state each time a message is received by the node, such that the current version is a maximum of the node's current version and a value received from the client.

18. The non-transitory computer readable medium of claim 13, wherein said internal system tables include a values table that maps a transaction identifier and synthetic key to a value.

\* \* \* \* \*